(12) United States Patent
Gong et al.

(10) Patent No.: US 8,675,575 B2
(45) Date of Patent: Mar. 18, 2014

(54) SCHEDULING MECHANISMS FOR MEDIA ACCESS CONTROL PROTECTION AND CHANNEL SOUNDING

(75) Inventors: Michelle X. Gong, Sunnyvale, CA (US); Robert J. Stacey, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 152 days.

(21) Appl. No.: 12/655,158

(22) Filed: Dec. 23, 2009

(65) Prior Publication Data

US 2011/0149882 A1 Jun. 23, 2011

(51) Int. Cl.
*H04W 4/00* (2009.01)

(52) U.S. Cl.
USPC ........... 370/329; 370/328; 370/331; 370/310; 455/450; 455/464; 455/436

(58) Field of Classification Search
None
See application file for complete search history.

(56) References Cited

U.S. PATENT DOCUMENTS

| | | | |
|---|---|---|---|
| 2005/0285719 A1* | 12/2005 | Stephens | 340/10.2 |
| 2006/0281494 A1 | 12/2006 | Wilson et al. | |
| 2007/0066299 A1* | 3/2007 | Roy et al. | 455/423 |
| 2007/0206559 A1* | 9/2007 | Cho et al. | 370/344 |
| 2007/0230373 A1 | 10/2007 | Li et al. | |
| 2007/0298742 A1* | 12/2007 | Ketchum et al. | 455/186.1 |
| 2008/0112351 A1* | 5/2008 | Surineni et al. | 370/312 |
| 2008/0112368 A1* | 5/2008 | Kwon | 370/336 |
| 2010/0248635 A1* | 9/2010 | Zhang et al. | 455/63.1 |

FOREIGN PATENT DOCUMENTS

| | | |
|---|---|---|
| CN | 101548573 A | 9/2009 |
| KR | 10-2007-0073880 A | 7/2007 |
| KR | 10-2007-0111559 A | 11/2007 |
| WO | 2006/041891 A2 | 4/2006 |
| WO | 2011/087578 A2 | 7/2011 |
| WO | 2011/087578 A3 | 9/2011 |

OTHER PUBLICATIONS

International Search Report and Written Opinion received for International Patent Application No. PCT/US2010/057583, mailed on Jul. 26, 2011, 8 pages.
Novak, Robert, et al., "Proposal for IEEE 802.16m SDMA and Beamforming", IEEE, Nortel Networks, IEEEC802.16m-08/345r2, May 13, 2008, 18 pages.
International Preliminary Report on Patentability and Written Opinion received for PCT Patent Application No. PCT/US2010/057583, mailed on Jul. 5, 2012, 5 pages.
Office Action received for Korean Patent Application No. 10-2012-7013941, mailed on Aug. 15, 2012, 2 pages of English Translation and 3 pages of Office Action.
Office Action received for Korean Patent Application No. 10-2012-7013941, mailed on Dec. 18, 2012, 6 pages of English Translation and 5 pages of Office Action.
Office Action received for Korea Patent Application No. 10-2012-7013941, mailed on Mar. 28, 2013, 8 pages of Office action including 5 pages of English Translation.
Office Action received for Chinese Patent Application No. 201010620685.1, mailed on Apr. 2, 2013, 16 pages of English Translation and 11 pages of Office Action.

(Continued)

*Primary Examiner* — Anez Ebrahim
(74) *Attorney, Agent, or Firm* — Forefront IP Lawgroup, PLLC

(57) ABSTRACT

Channel sounding for spatial division multiple access (SDMA) under the IEEE 802.11 protocol is described.

19 Claims, 12 Drawing Sheets

(56) References Cited

OTHER PUBLICATIONS

Office Action received for Korean Patent Application No. 10-2012-7020314, mailed on Jun. 26, 2013, 4 pages of English Translation and 5 pages of Office Action.

Office Action received for Korean Patent Application No. 10-2012-7013941, mailed on Jul. 30, 2013, 5 pages of English Translation and 5 pages of Office Action.

Office Action received for Chinese Patent Application No. 201010620685.1, mailed on Oct. 10, 2013, 15 pages of English Translation and 9 pages of Chinese Office Action.

* cited by examiner

US 8,675,575 B2

SCHEDULING MECHANISMS FOR MEDIA ACCESS CONTROL PROTECTION AND CHANNEL SOUNDING

BACKGROUND

In communication systems, signals are sent in packet form from a first communication node through a network to a second communication node. The first and second communication nodes may implemented in any number of ways, including but not limited to as a wireless base station, a wireless access point (AP), computers such as a server computer, a personal computer, a laptop, a personal digital assistant (PDA), a smart phone, a hand-held computing device (e.g., a personal digital assistant (PDA)), a mobile telephone, a media playing device, a portable gaming device, a personal computer, a laptop computer, another suitable wireless communication device, or any combination thereof.

These packets typically include one or more headers and a payload, which is the useful data to be sent, received and used by the communication nodes. The signals generated by the first communication node may reach the second communication node via a number of different channels, the characteristics of which typically change over time due to the phenomena of multi-path and fading. Moreover, the characteristics of a channel differ or vary based on the frequency of propagation. To compensate for the variations and to enhance effective encoding and modulation in the communication system, each communication node of the communication system may periodically develop or collect channel state information (CSI) for each of the channels. Generally speaking, CSI is information defining or describing one or more characteristics about each of the channels. Upon determining the CSI for one or more channels, the communication nodes may send this CSI back to the transmitter, which may use the CSI for each channel to precondition the signals transmitted using that channel so as to compensate for the varying propagation effects of each of the channels.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components.

DETAILED DESCRIPTION

The present application describes channel sounding for spatial division multiple access (SDMA) under the IEEE 802.11 protocol. Many specific details are set forth in the following description and in FIGS. 1-12 to provide a thorough understanding of various implementations. One skilled in the art will understand, however, that the subject matter described herein may have additional implementations, or that the concepts set forth may be practiced without several of the details described in the following description.

Communications System 100

Figure 1:
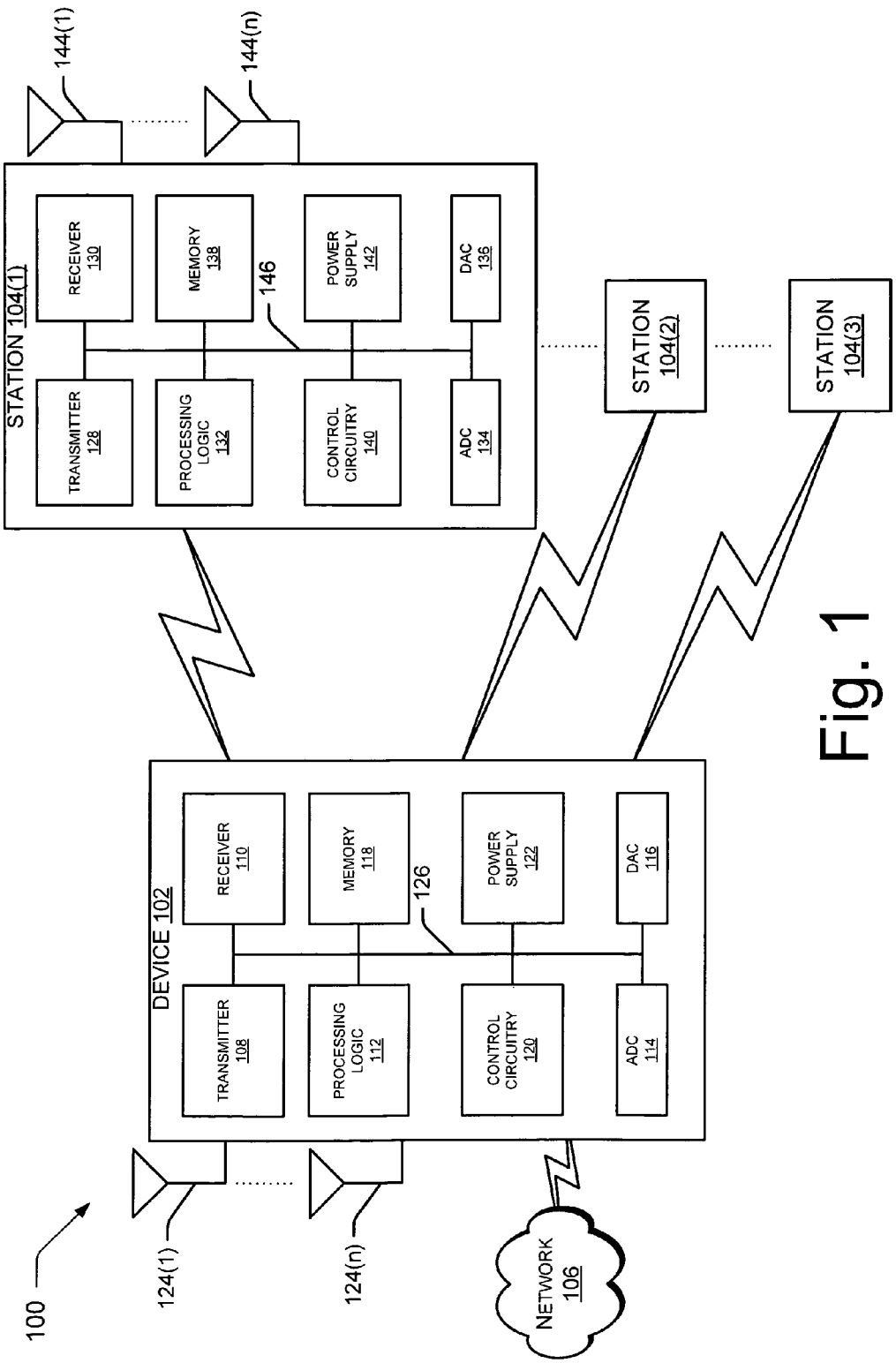
FIG. 1 is a block diagram illustrating an environment of a communications network.

FIG. 1 is a block diagram of a communication system 100. Communication system 100 includes a device 102, a plurality of stations (STA) 104(1), 104(2), ..., 104(n), and a network 106. Communication system 100 may operate within the Institute of Electrical and Electronic Engineering (IEEE) 802.11 protocol network. In an embodiment, the communication system 100 may further be operating under SDMA, wherein each of the plurality of stations 104 are within the same SDMA group. However, in a further implementation, a subset of the plurality of stations 104 are within the same SDMA group.

Device 102

The device 102 includes a transmitter 108, a receiver 110, processing logic 112, an analog-to-digital converter (ADC) 114, a digital-to-analog converter (DAC) 116, a memory 118, control circuitry 120, a power supply 122, antenna(s) 124, and a bus 126. The device 102 is configured to transmit to, and receive signals from, the plurality of stations 104. Specifically, the DAC 116 converts signals from digital to analog such that the transmitter 108 may transmit wireless signals via the antenna(s) 124. The receiver 110 receives wireless signals via the antenna(s) 124 and converts the signals from analog to digital via the ADC 114. The wireless signals may comprise voice, data, control information, or any combination thereof. The device 102 may be a multi-input, multi-output (MIMO) device.

The processing logic 112 may include one or more processors and the memory 118 is accessible to the processing logic 112. The memory 118 may include read-only memory (ROM), random access memory (RAM), flash memory, a hard disk, or any combination thereof. Additionally, the memory 118 may store one or more applications configured to transmit and/or receive the wireless signals. For example, the memory 118 may store an application configured to send and receive website data. The applications stored in the memory 118 may include software instructions, hardware, or any combination thereof. Additionally, the control circuitry 120 provides control signals to the components of the device 102. The device 102 may include a single antenna 124 or a plurality of antennas 124. The antenna(s) 124 may be any type of antenna including, but not limited to, an omni-directional antenna, a directional antenna, a high-gain antenna, or a combination thereof.

The device 102 may be implemented in any number of ways, including but not limited to, as a wireless base station, a wireless access point (AP), computers such as a server computer, a personal computer, a laptop, a personal digital assistant (PDA), or any combination thereof.

Station (STA) 104

The station 104 includes a transmitter 128, a receiver 130, processing logic 132, an analog-to-digital converter (ADC) 134, a digital-to-analog converter (DAC) 136, a memory 138, control circuitry 140, a power supply 142, antenna(s) 144, and a bus 146. The station 104 is configured to transmit to, and receive signals from the device 102. Specifically, the DAC 136 converts signals from digital to analog such that the transmitter 128 may transmit wireless signals via the antenna(s) 144. The receiver 130 receives wireless signals via the antenna(s) 144 and converts the signals from analog to digital via the ADC 134. The wireless signals may comprise voice, data, control information, or any combination thereof. Station 104 may be a MIMO device.

The processing logic 132 may include one or more processors and the memory 138 is accessible to the processing logic 132. The memory 138 may include read-only memory (ROM), random access memory (RAM), flash memory, a hard disk, or any combination thereof. Additionally, the memory 138 may store one or more applications configured to transmit and/or receive the wireless signals. For example, the memory 138 may store an application configured to send and receive website data. The applications stored in the memory 138 may include software instructions, hardware, or any combination thereof. Additionally, the control circuitry 140 provides control signals to the components of the station 104. The station 104 may include a single antenna 144 or a plurality of antennas 144. Antenna(s) 144 may be any type of antenna including, but not limited to, an omni-directional antenna, a directional antenna, a high-gain antenna, or a combination thereof.

The plurality of stations 104 may be implemented in any number of ways, including, but not limited to, as a smart phone, a hand-held computing device (e.g., a personal digital assistant (PDA)), a mobile telephone, a media playing device, a portable gaming device, a personal computer, a laptop computer, another suitable wireless communication device, or any combination thereof.

Network 106

The network 106 is configured to transmit signals to, and receive signals from the device 102. The signals may comprise voice, data, control information, or any combination thereof. The network 106 may be implemented in any number of ways, including, but not limited to, a wireless network, a wireline network, a wireless local area network (WLAN), wireless personal area network (WPAN) and/or wireless metropolitan area network (WMAN).

Channel Sounding

During employment of the communications system 100, each station 104 communicates with the device 102 via a channel. Each channel employed within communication system 100 may have channel station information (CSI) associated therewith, the CSI including information describing various characteristics of the channel. By obtaining the CSI of the channels by the device 102, communication between stations 104 and the device 102 may be facilitated. To that end, it may be desired to concurrently obtain the CSI of the channels employed by the plurality of stations 104 during communication between each station 104 and the device 102 while minimizing overhead. To concurrently obtain the CSI of the channels, the device 102 may schedule a desired order in which each station 104 transmits the CSI (implicitly or explicitly) of the channel the station 104 is employing to device 102, described further below.

Scheduling Responses Via PHY Header

Figure 2:
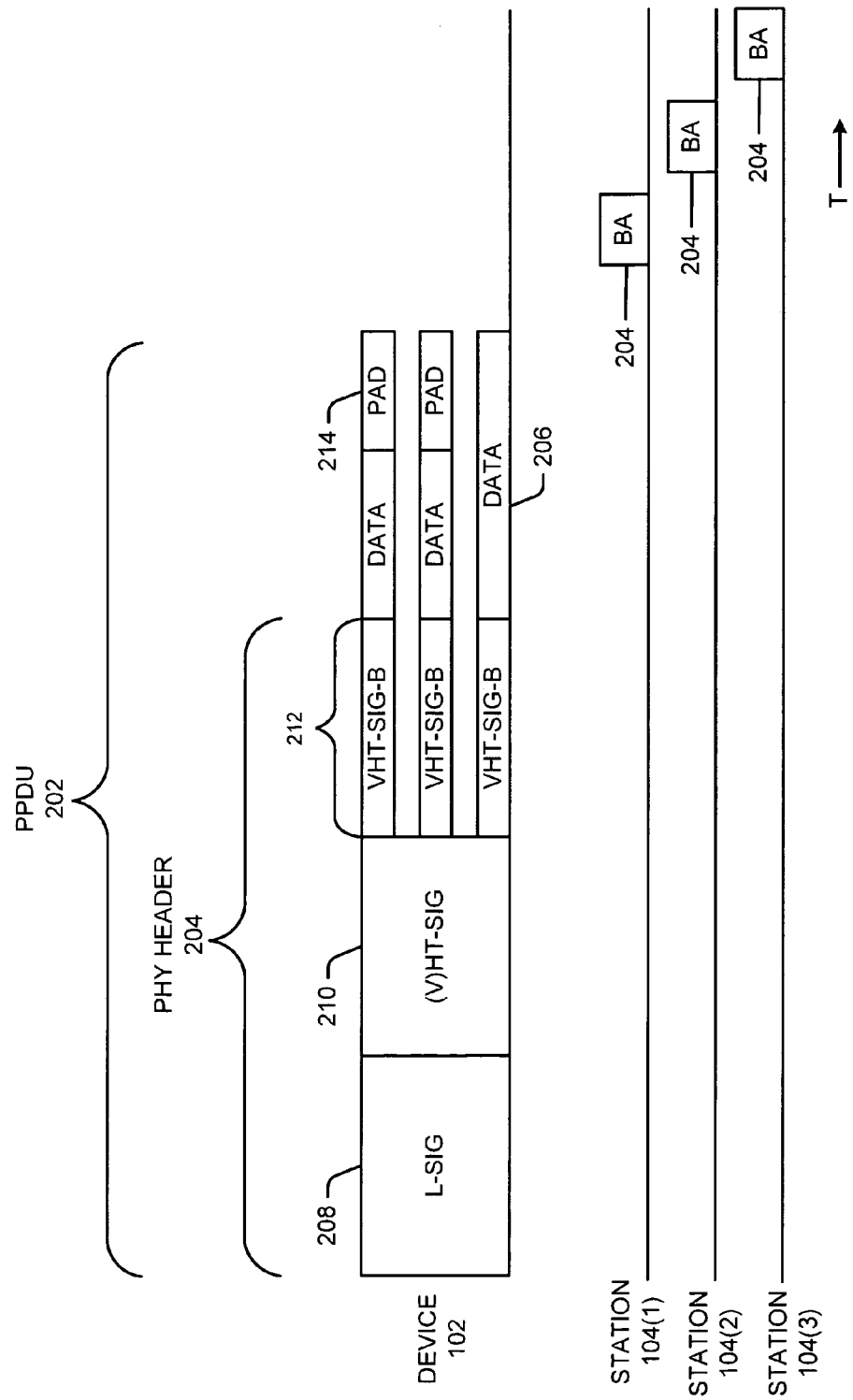
FIG. 2 is an illustration of scheduling responses using a field of a PHY header of a data block.

Referring to FIG. 2, a first illustration of transmission of multiple data units (PPDU) 202 and block acknowledgements (BA) 204 is shown. Specifically, device 102 transmits the PPDU 202 to each station 104 and in response, each station 104 transmits the BA 204 to device 102. In an implementation, the BA 204 may have the CSI comprised therein; however, in a further implementation, the BA 204 may have the CSI appended thereto. In the following example, each station 104 is within the same SDMA group.

The PPDU 202 includes: 1) a physical (PHY) header 204; and 2) a data portion 206 including a media access control (MAC) header. The PHY header 204 includes a legacy signal (L-SIG) field 208, a very high throughput signal (VHT-SIG) field 210, and a VHT-SIG-B field 212.

The device 102 first transmits the PHY header 204 of the PPDU 202 to the plurality of stations 104. Specifically, the device 102 transmits the L-SIG field 208 and the VHT-SIG field 210 to the plurality of stations 104 in an omni-directional fashion and subsequently, transmits the VHT-SIG-B field 212 to each station 104 in a beam-formed fashion. As a result of transmitting VHT-SIG-B field 212 in a beam-formed fashion to each station 104, the contents of VHT-SIG-B field 212 may differ for each station 104.

After transmission of the PHY header 204 by the device 102 to the plurality of stations 104, the device 102 transmits the data portion 206 of the PPDU 202 to the plurality of stations 104. Specifically, the device 102 transmits the data portion 206 and a padding field 214 (if necessary) to each station 104 in a beam-formed fashion. As a result of transmitting the data portion 206 and the padding field 214 in a beam-formed fashion to each station 104, the contents of the data portion 206 and the padding field 214 may differ for each station 104.

As mentioned above, after receiving the PPDU 202 and in response thereto, each station 104 transmits the BA 204 to the device 102. However, it may be desired to schedule the transmission of the BA 204 to the device 102 by each station 104 such that the device 102 may decode each BA 204 received.

To facilitate scheduling the transmission of the BA 204 by each station 104 in a desired order and thus, the reception of the BA 204 from each station 104 by the device 102 in the desired order, the contents of the VHT-SIG-B field 212 transmitted to each station 104 may comprise an offset value that indicates when transmission of the BA 204 by each station 104 should start or when the transmission of the BA 204 by each station 104 should end. To that end, by the device 102 transmitting VHT-SIG-B fields 212 including differing offsets for each station 104, the device 102 is able to effectively schedule the desired order for transmission of the BA 204 by each station 104, and further, the desired order for reception of the BA 204 by the device 104. Specifically, the VHT-SIG-B fields 212 transmitted to each station 104 determines the order in which each station 104 will respond with the BA 204 to the device 102, with the order being determined by the device 102.

Scheduling Responses Via a Schedule Frame

Figure 3:
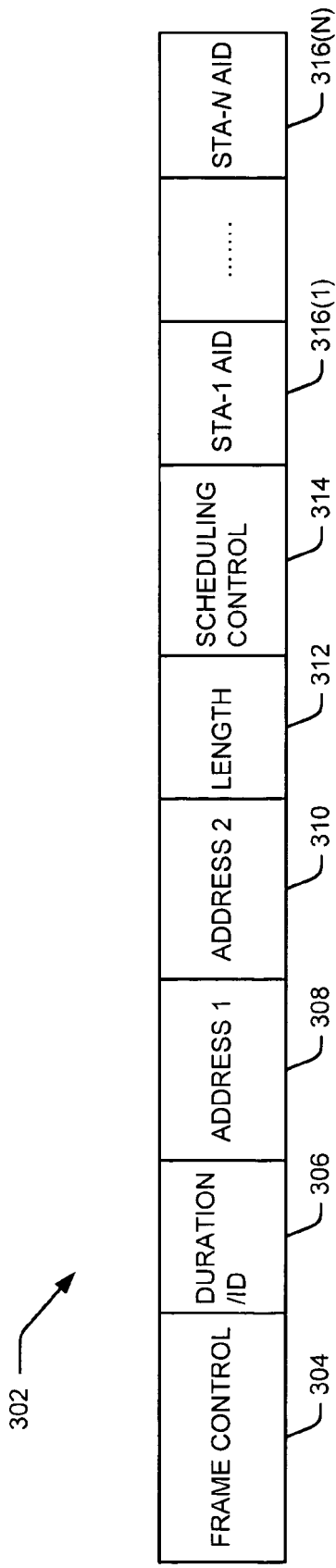
FIG. 3 is an illustration of a format of a scheduling frame.

In a further implementation, it may be desired to schedule the order of responses by each station 104, and thus, the reception of the response by the device 102 when at least a subset of the plurality of stations 104 are not within the same SDMA group. To schedule the responses by each station 104 when at least a subset of the plurality of stations 104 are not within the same SDMA group, a schedule frame 302 may be employed, as shown in FIG. 3.

The schedule frame 302 includes a frame control field 304, a duration identification field 306, a first address field 308 (the receive address), a second address field 310 (the transmit address), a length field 312, a scheduling control field 314, and station association identification (AID) fields 316(1), 316(2), . . . , 316 (n).

The device 102 transmits the schedule frame 302 in an omni-directional fashion to the plurality of stations 104. After receiving the schedule frame 302, and in response thereto, each station 104 transmits a response frame, described further below, to the device 102. Further, analogous to that mentioned above with respect to the BA 204 and FIG. 2, it may be desired to schedule the order of responses transmitted by each station 104, and thus, the reception of the responses by the device 102.

Figure 4:
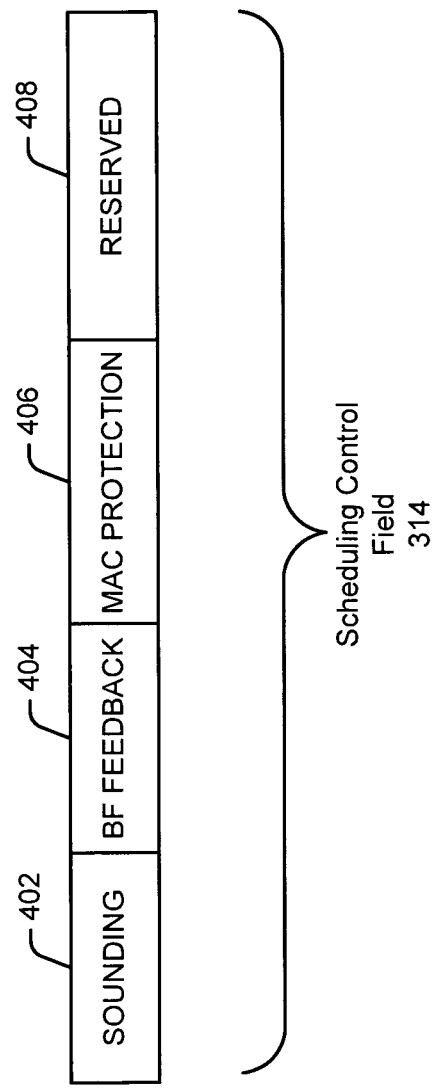
FIG. 4 is an illustration of a scheduling control field of a scheduling frame.

The type of CSI within, or appended to the response, that is desired by the device 102 is described within the scheduling frame 302. Specifically, the scheduling control field 314 indicates which type of response is solicited from each station 104 by the device 102. Referring to FIG. 4, specifically, scheduling control field 314 includes a sounding field 402, a beamform (BF) feedback field 404, a media access control (MAC) protection field 406, and a reserved field 408. In an implementation, the scheduling control field 314 is 1 octet long and the sounding field 402, the BF feedback field 404, and the MAC protection field 406 are each 1 bit with the reserved field 408 being 5 bits. To that end, depending on which of the fields 402, 404, and 406 are indicated as desired (e.g. which of the fields 402, 404, and 406 are set to have a value of 1), indicates which type of CSI is solicited from the plurality of stations 104 by the device 102. In a further implementation, any combination of fields 402, 404, and 406 may be indicated.

To facilitate scheduling the transmission of the responses by each station 104 in the desired order and thus, the reception of the response from each station 104 by the device 102 in the desired order the station AID fields 316 within the schedule frame 302 are placed in the desired order that the transmission of the response is to occur. Specifically, by positioning the station AID fields 316 in the desired order determined by the device 102, the device 102 is able to effectively schedule the desired order for transmission of the response by each station 104, and further, the desired order for reception of the response by the device 104.

Figure 5:
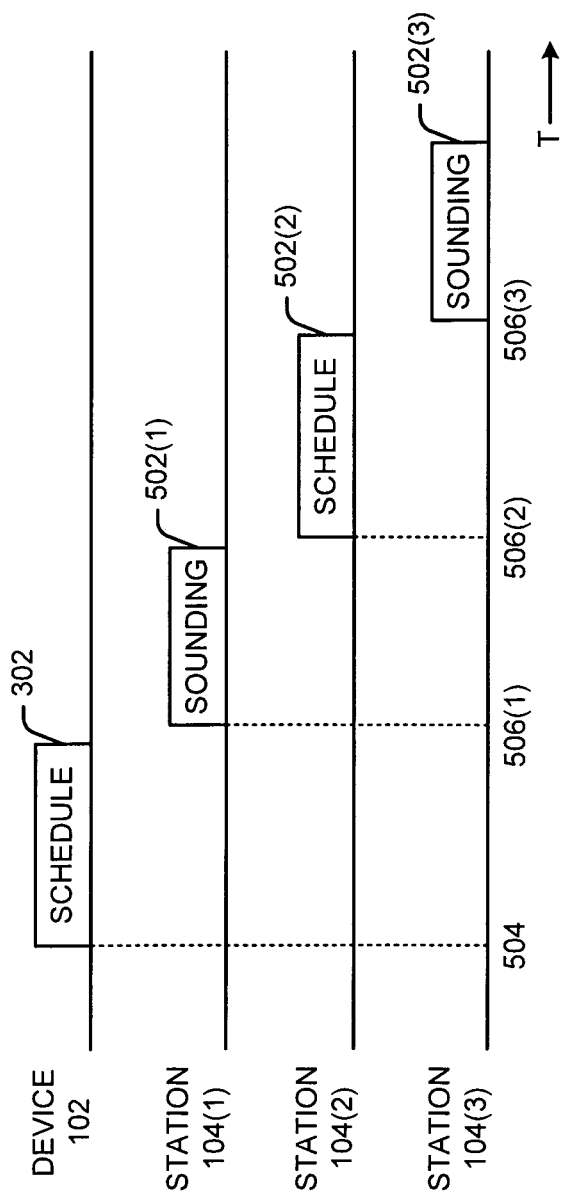
FIG. 5 is an illustration of communication between a device and a plurality of stations, with scheduling of channel sounding for implicit feedback.

Referring to FIG. 5, a second illustration of communication between the device 102 and the plurality of stations 104 is shown wherein a sounding frame response 502 is solicited from the plurality of stations 104. Specifically, the device 102 transmits omni-directionally the schedule frame 302 to the plurality of stations 104 at a time 504, wherein the sounding field 402 of the scheduling control field 314 is indicated. After the device 102 transmits the schedule frame 302 to the plurality of stations 104, each station 104 responds with the sounding frame response 502 at a time 506. The order in which each station 104 responds with the sounding frame response 502 is determined by the order of the station AID fields 316 within the sounding frame 302. In the present example, the order of the sounding frame responses 502 transmitted by the plurality of stations 104 is sounding frame response 502(1) at time 506(1), sounding frame response 502(2) at time 506(2), and sounding frame response 502(3) at time 506(3); however, any order may be employed depending upon the particular application. Further, each sounding frame response 502 transmitted by the plurality of stations 104 may be separated by a short interface space (SIF).

Figure 6:
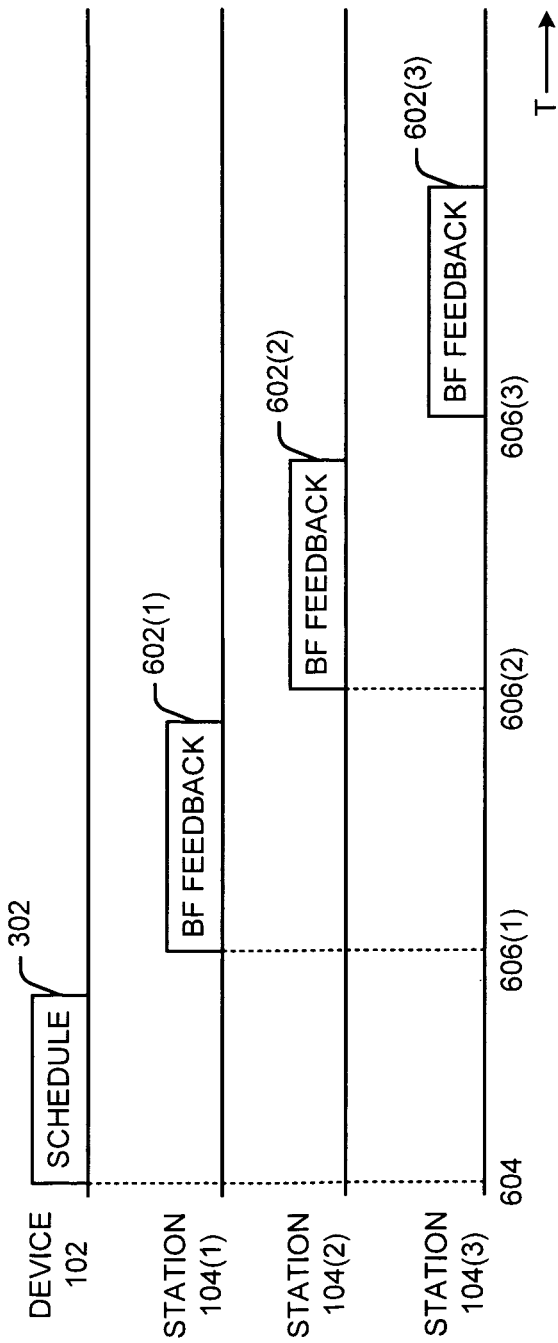
FIG. 6 is an illustration of communication between a device and a plurality of stations, with scheduling for explicit feedback.

Referring to FIG. 6, a third illustration of communication between the device 102 and the plurality of stations 104 is shown wherein a BF feedback frame response 602 is solicited from the plurality of stations 104. Specifically, the device 102 transmits omni-directionally the schedule frame 302 at a time 604, wherein the BF feedback field 404 of the scheduling control field 314 is indicated. After the device 102 transmits the schedule frame 302 to the plurality of stations 104, each station 104 responds with the BF feedback frame response 602 at a time 606. The order in which each station 104 responds with the BF feedback frame response 602 is determined by the order of the station AID fields 316 within the sounding frame 302. In the present example, the order of the BF feedback frame response 602 transmitted by the plurality of stations 104 is BF feedback frame response 602(1) at time 606(1), BF feedback frame response 602(2) at time 606(2), and BF feedback frame response 602(3) at time 606(3); however, any order may be employed depending upon the particular application. Further, each BF feedback frame response 602 transmitted by the plurality of stations 104 may be separated by a short interface space (SIF).

Figure 7:
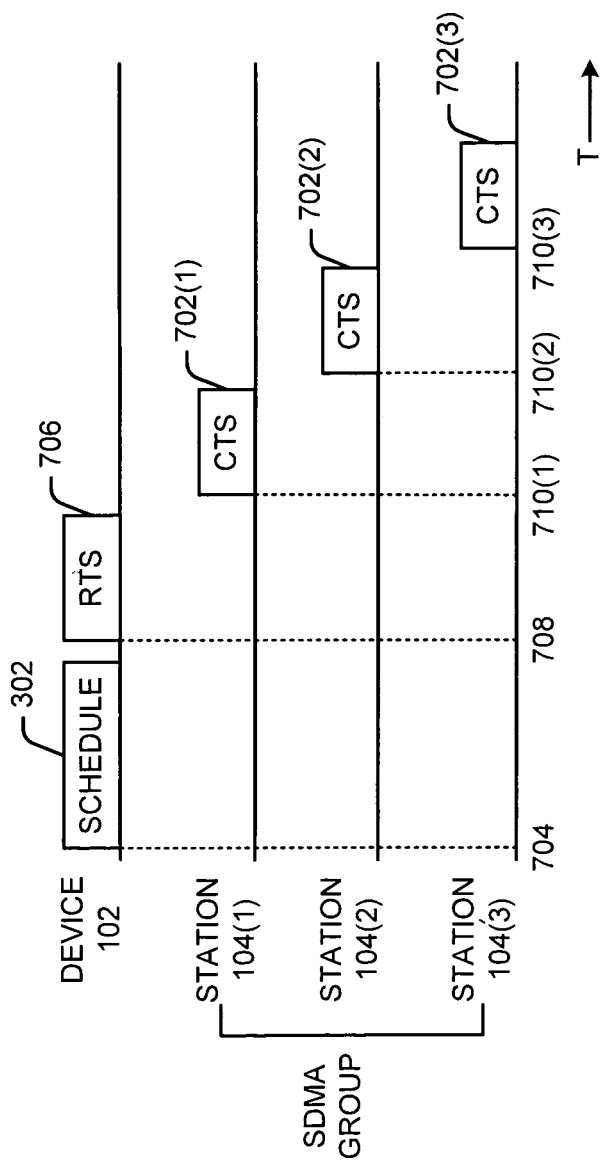
FIG. 7 is an illustration of communication between a device and a plurality of stations, with scheduling for MAC protection.

Referring to FIG. 7, a fourth illustration of communication between the device 102 and the plurality of stations 104 is shown wherein a MAC protection frame response 702 is solicited from the plurality of stations 104. Specifically, the device 102 transmits omni-directionally the schedule frame 302 at a time 704, wherein the MAC protection field 406 of scheduling control field 314 is indicated. Further, after transmitting the schedule frame 302 by the device 102, the device 102 transmits a request to send (RTS) frame 706 at a time 708. After the device 102 transmits the RTS frame 706 to the plurality of stations 104, each station 104 responds with the MAC protection frame response 702 at a time 710, wherein the MAC protection frame response 702 is a clear to send (CTS) frame 702. The order in which each station 104 responds with the CTS frame 702 is determined by the order of the station AID fields 316 within the sounding frame 302. In the present example, the order of responses transmitted by the plurality of stations 104 is CTS frame response 702(1) at time 710(1), CTS frame response 702(2) at time 710(2), and CTS frame response 702(2) at time 710(3); however, any order may be employed depending upon the particular application. Further, each CTS frame response 704 transmitted by the plurality of stations 104 may be separated by a short interface space (SIF). In a further implementation, the plurality of stations 104 are within the same SDMA group.

Scheduling Responses in a Data Transmission Opportunity (TXOP)

In a further implementation, it may be desired to schedule the order of responses by each station 104, and thus, the reception of the response by the device 102, wherein the communications network 100 is in a data transmission opportunity (TXOP).

Figure 8:
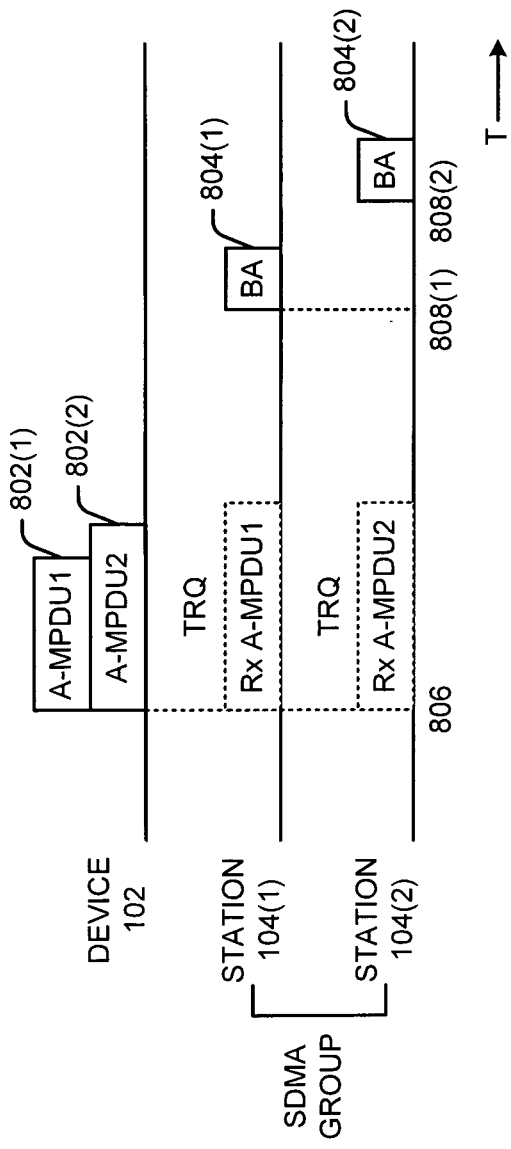
FIG. 8 is an illustration of communication between a device and a plurality of stations, with scheduling of implicit channel sounding.

Referring to FIG. 8, a fifth illustration of communication between the device 102 and the plurality of stations 104 is shown and specifically of implicit channel sounding within a TXOP. Specifically, transmission of MAC protocol data units (MPDU) 802 by the device 102 to the plurality of stations 104 and transmission of a BA 804 by the plurality of stations 104 to the device 102 is shown.

The device 102 transmits the MPDU 802 at a time 806 in a beam formed fashion to the plurality of stations 104. In response, the plurality of stations 104 transmit the BA 804 at a time 808 to the device 102. The MPDU 802 may be analogous to that of the PPDU 302 of FIG. 3 in that the MPDU 802 may comprise a VHT-SIG-B field. As a result, the contents of the VHT-SIG-B field of the MPDU 802 transmitted to each station 104 may comprise an offset value that indicates when transmission of the BA 804 by each station 104 should start or when the transmission of the BA 804 by each station 104 should end. To that end, by the device 102 transmitting the VHT-SIG-B fields of the MPDU 802 including differing offsets for each station 104, the device 102 is able to effectively schedule the desired order for transmission of the BA 804 by each station 104, and further, a desired sequential order for reception of the BA 804 by the device 104. Specifically, the VHT-SIG-B fields of the MPDU 802 transmitted to each station 104 determines the order in which each device will respond with the BA 804 to the device 102, with the order being determined by the device 102. In an implementation, the BA 204 may have the CSI comprised therein; however, in a further implementation, the BA 204 may have the CSI appended thereto. In a further implementation, the plurality of stations 104 are within the same SDMA group.

Figure 9:
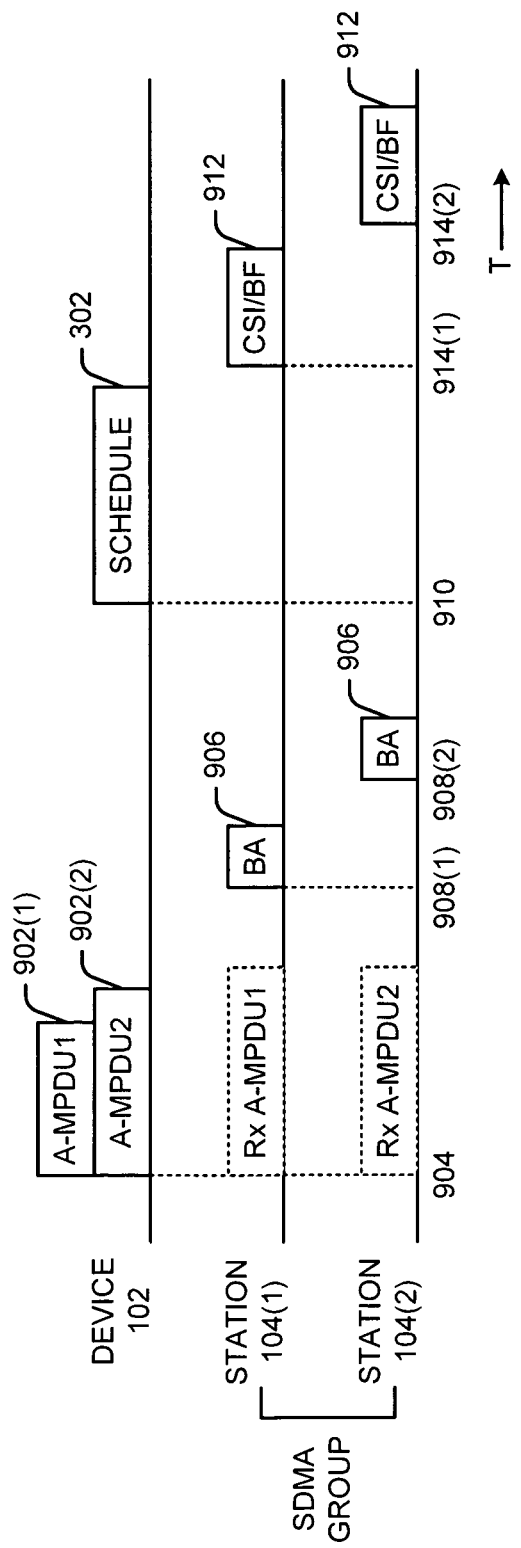
FIG. 9 is an illustration of communication between a device and a plurality of stations, with scheduling of explicit channel sounding within a transmission opportunity.

Referring to FIG. 9, a sixth illustration of communication between the device 102 and the plurality of stations 104 is shown, and specifically of explicit channel sounding within a TXOP. The device 102 transmits a MPDU 902 at a time 904 in a beam formed fashion to the plurality of stations 104. In response, the plurality of stations 104 transmit a BA 906 at a time 908 to the device 102. Further, the device 102 transmits omni-directionally the schedule frame 302 to the plurality of stations 104 at a time 910, wherein the BF feedback field 404 of the scheduling control field 314 is indicated. After the device 102 transmits the schedule frame 302 to the plurality of stations 104, each station 104 responds with the BF feedback response frame 912 at a time 914. The order in which each station 104 responds with the BF feedback response frame 912 is determined by the order of the station AID fields 316 within the sounding frame 302. In a further implementation, the plurality of stations 104 are within the same SDMA group.

Figure 10:
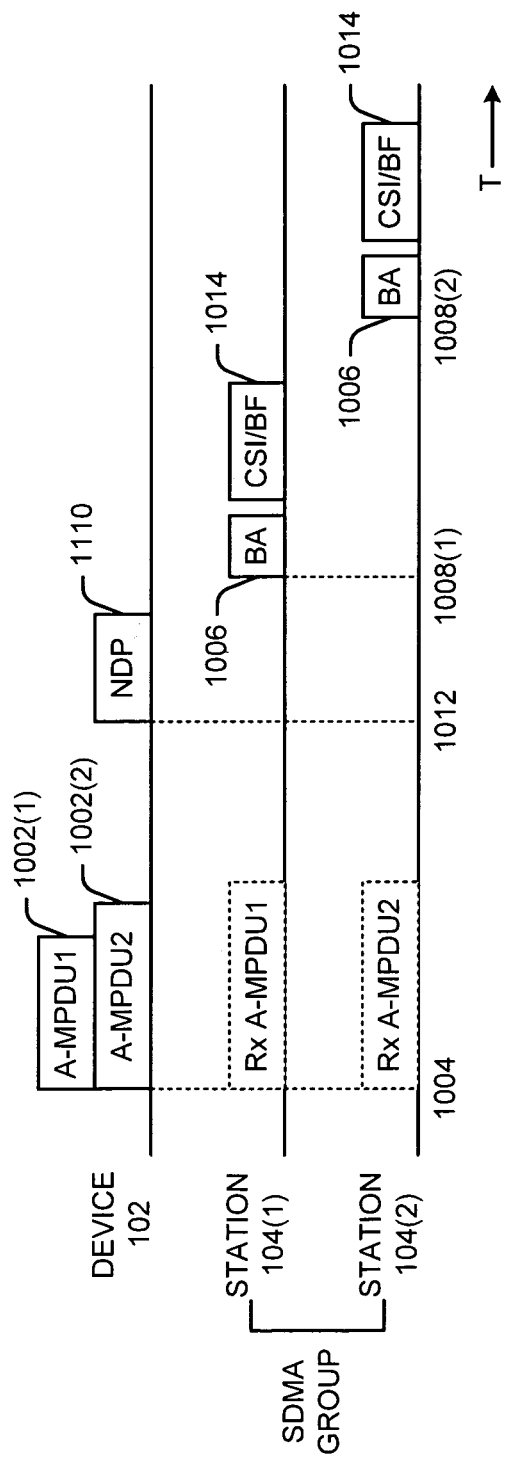
FIG. 10 is an illustration of communication between a device and a plurality of stations, with scheduling of explicit channel sounding with a null data packet frame.

Referring to FIG. 10, a seventh illustration of communication between the device 102 and the plurality of stations 104 is shown, and specifically of explicit channel sounding with a null data packet frame within a TXOP. The device 102 transmits a MPDU 1002 at a time 1004 in a beam-formed fashion to the plurality of stations 104. In response, the plurality of stations 104 transmit a BA 1006 at a time 1008 to the device 102. Analogous to that of FIG. 8, by the device 102 transmitting the VHT-SIG-B fields of the MPDU 1002 including differing offsets for each station 104, the device 102 is able to effectively schedule the desired order for transmission of the BA 1006 by each station 104, and further, the desired order for reception of the BA 1006 by the device 102.

Furthermore, the device 102 transmits a null data packet (NDP) frame 1010 at a time 1012 in an omni-directional fashion to the plurality of stations 104. The NDP frame 1010 may be analogous to that of sounding frame 302 of FIG. 3. To that end, a BF feedback field of a scheduling control field of the NDP frame 1010 is indicated. In response, the plurality of stations 104 transmit a BF feedback frame response 1014 to the device 102. The BF feedback frame response 1014 may be appended to the BA 1006. In a further implementation, the plurality of stations 104 are within the same SDMA group.

Figure 11:
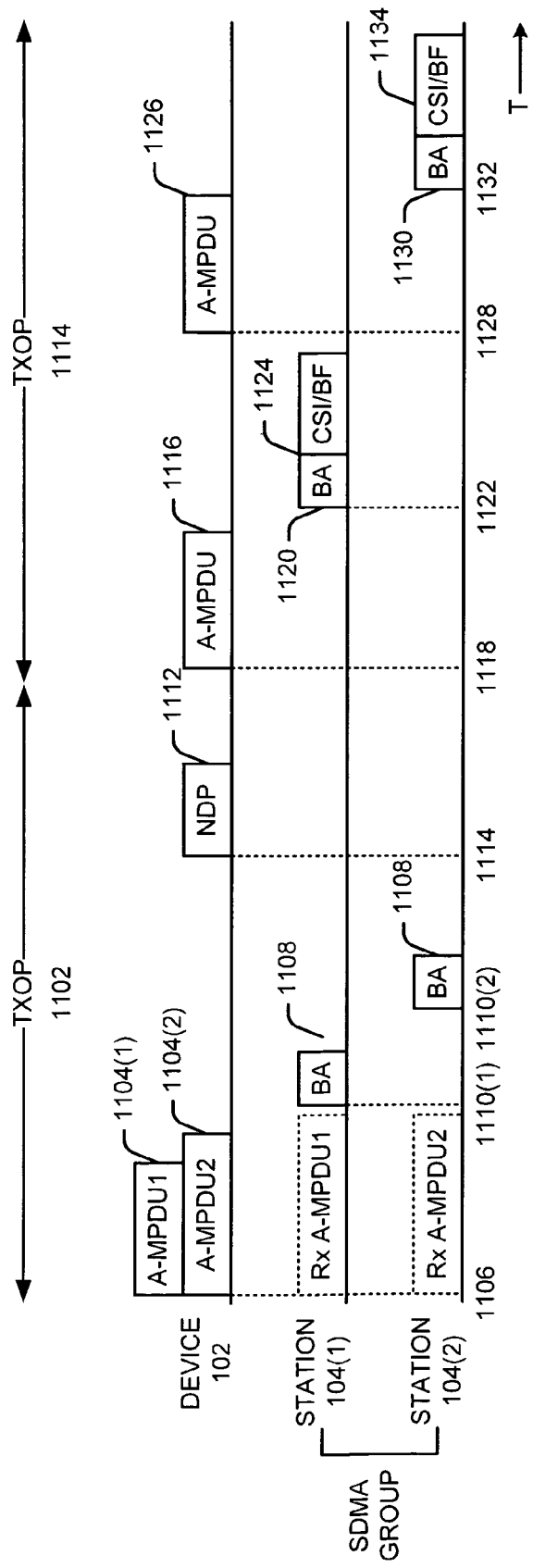
FIG. 11 is an illustration of communication between a device and a plurality of stations, with scheduling of explicit channel sounding with feedback sent in differing transmission opportunity.

Referring to FIG. 11, an eight illustration of communication between the device 102 and the plurality of stations 104 is shown, and specifically of explicit channel sounding when the BF feedback is sent in a different TXOP. In a first TXOP 1102, the device 102 transmits a MPDU 1104 at a time 1106 in a beam-formed fashion to the plurality of stations 104. In response, the plurality of stations 104 transmit a BA 1108, respectively, at a time 1110 to the device 102. Furthermore, the device 102 transmits a null data packet (NDP) frame 1112 at a time 1114 in an omni-directional fashion to the plurality of stations 104. The NDP frame 1110 may be analogous to that of the sounding frame 302 of FIG. 3. To that end, a BF feedback field of a scheduling control field of NDP frame 1112 is indicated.

In a second TXOP 1114, the device 102 transmits a second MPDU 1116 at a time 1118 in a beam-formed fashion to the station 104(1). In response, the station 104(1) transmits BA 1120 at a time 1122 to the device 102. A BF feedback frame response 1124 may be appended to the BA 1120. Further, the device 102 transmits a third MPDU 1126 at a time 1128 in a beam-formed fashion to the station 104(2). In response, the station 104(2) transmits BA 1130 at a time 1132 to the device 102. A BF feedback frame response 1134 may be appended to the BA 1130. In a further implementation, the plurality of stations 104 are within the same SDMA group.

Scheduling Response Via Block Acknowledge Request

Figure 12:
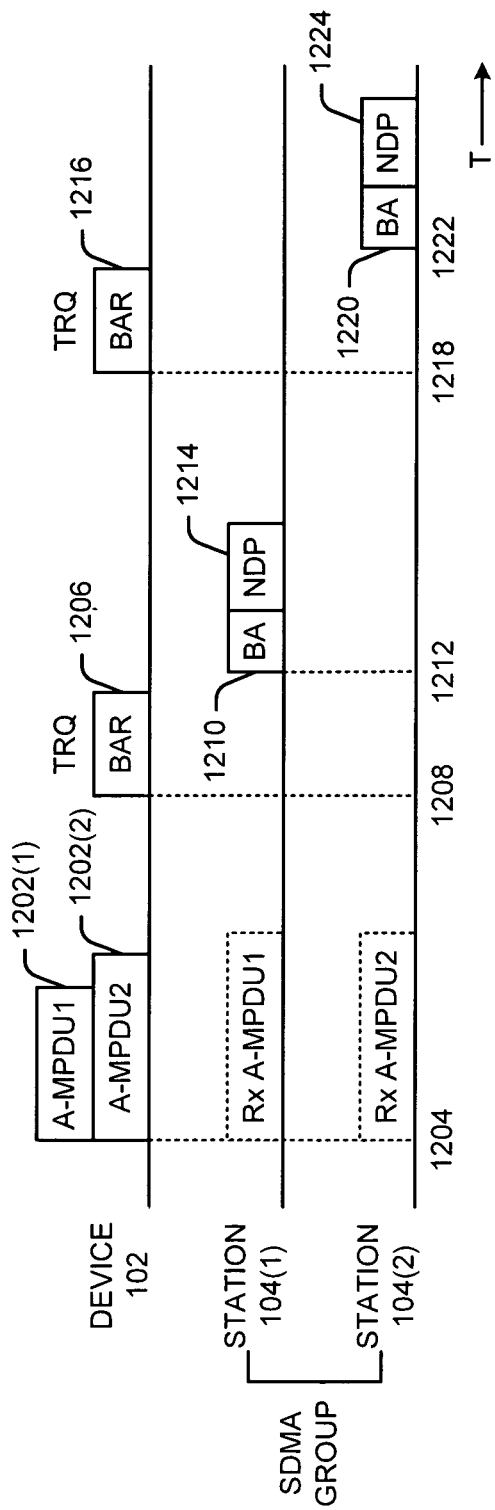
FIG. 12 is an illustration of communication between a device and a plurality of stations, with scheduling of implicit channel sounding with a null data packet.

Referring to FIG. 12, a ninth illustration of communication between the device 102 and the plurality of stations 104 is shown, and specifically of implicit channel sounding with a block acknowledgement request. The device 102 transmits a MPDU 1202 at a time 1204 in a beam-formed fashion to the plurality of stations 104. Further, the device 102 transmits a block acknowledgement request (BAR) 1206 at a time 1208 in a beam-formed fashion to the station 104(1). In response, the station 104(1) transmits BA 1210 at a time 1212 to the device 102. The BA 1210 may have a NDP frame 1214 appended thereto, the NDP frame 1214 including CSI of the channel employed by the station 104(1).

Subsequent to receiving the BA 1210 and the NDP frame 1214 by the device 102, the device 102 transmits a BAR 1216 at a time 1218 in a beam-formed fashion to the station 104(2). In response, the station 104(2) transmits a BA 1220 at a time 1222 to the device 102. The BA 1220 may have a NDP frame 1224 appended thereto, the NDP frame 1224 including CSI of the channel employed by the station 104(2). In a further implementation, the plurality of stations 104 are within the same SDMA group.

CONCLUSION

Although embodiments of communication systems have been described in language specific to structural features and/or methods, it is to be understood that the subject of the appended claims is not necessarily limited to the specific features or methods described. Rather, the specific features and methods are disclosed as exemplary implementations for communication systems.

What is claimed is:

1. A method comprising:
   transmitting, by a device, at least one data block comprising at least one field to one or more stations, the at least one field comprising a very high throughput signal (VHT-SIG-B) field that includes an offset value, the VHT-SIG-B field is transmitted in a beam formed fashion to facilitate differing offset value for each station, wherein the offset value indicates start and end of transmission of a block acknowledgement by each station;
   receiving, by the device, of the block acknowledgement from each station, where an order of receiving the block acknowledgement is based upon the transmitted offset value;
   transmitting, by the device, of a schedule frame that includes station association identification (STA-AID) fields, the STA AID fields facilitate a desired order of transmitting a response by each station;

and receiving in the desired order, by the device, of the response from the one or more stations;

transmitting a null data packet frame that solicits a beam form (BF) feedback frame as the response, the response is appended to the block acknowledgement (BA) during a transmission by the station to the device.

2. The method of claim 1, further comprising wherein the response comprises a sounding frame, a beamform feedback frame, a medium access control (MAC) protection sequence frame, or any combination thereof.

3. The method of claim 1, wherein the schedule frame is transmitted in an omni-directional fashion.

4. The method of claim 1, wherein the method is performed during a transmission opportunity (TXOP).

5. The method of claim 1, wherein the block acknowledgement is transmitted during a transmission opportunity (TXOP) while the response is transmitted in another separate transmission opportunity (TXOP).

6. The method of claim 1, wherein the one or more stations are within a same spatial division multiple access (SDMA) group.

7. The method of claim 1, wherein the response comprises channel state information.

8. The method of claim 1, wherein the response is either implicit or explicit channel sounding.

9. A method comprising:
transmitting simultaneously during a transmission opportunity (TXOP), by a device, a schedule frame to one or more stations, the schedule frame comprising a plurality of station association identifier (STA-AID) fields, that is configured to facilitate a desired order of transmitting a response by each station and one field comprising a very high throughput signal (VHT-SIG-B) field that includes an offset value, the VHT-SIG-B field is transmitted in a beam formed fashion to facilitate differing offset value for each station, wherein the offset value indicates start and end of transmission of a block acknowledgement by each station;

and receiving during the TXOP, by the device, of the block acknowledgement and a the response responsive to the schedule frame from the one or more stations in the desired order;

transmitting a null data packet frame that solicits a beam form (BF) feedback frame as the response, the response is appended to the block acknowledgement (BA) during a transmission by the station to the device.

10. The method of claim 9, further comprising wherein the response comprises a sounding frame, a beamform feedback frame, a medium access control (MAC) protection sequence frame, or any Combination thereof.

11. The method of claim 9, wherein transmitting, further comprises transmitting a request-to-send frame subsequent to transmitting the data block, and wherein transmitting the response, by the one or more stations, further comprises transmitting a clear-to-send frame.

12. The method of claim 9, wherein the method is performed within the transmission opportunity (TXOP).

13. The method of claim 9, wherein an order of the STA-AID fields in the schedule frame corresponds to the desired order of transmission by each station.

14. The method of claim 9, wherein a subset of the one or more stations are within differing spatial division multiple access (SDMA) groups.

15. The method of claim 9, wherein the response comprises channel state information.

16. The method of claim 9, wherein the transmitting of the schedule frame is made in an.

17. The method of claim 9, wherein the response is either implicit or explicit channel sounding.

18. A device, comprising:
a processing unit;
a memory coupled to the processing unit;
a transmitter, coupled to the processing unit, to simultaneously transmit omni-directional a schedule frame during transmission opportunity (TXOP), the schedule frame comprising a plurality of station association identifier (STA-AID) fields, that is configured to facilitate a desired order of transmitting a response by each station, and one field comprising a very high throughput signal (VHT-SIG-B) field that includes an offset value, the VHT-SIG-B field is transmitted in a beam formed fashion to facilitate differing offset value for each station, wherein the offset value indicates start and end of transmission of a block acknowledgement by each station;
a receiver, coupled to the processing unit, to receive the block acknowledgement and the response from the one or more stations in the desired order, wherein the block acknowledgement and the response are received within the TXOP;
and transmitting a null data packet frame that solicits a beam form (BF) feedback frame as the response, the response is appended to the block acknowledgement (BA) during a transmission by the station to the device.

19. The device of claim 18, wherein the response comprises a sounding frame, a beamform feedback frame, a medium access control (MAC) protection sequence frame, or any combination thereof.

* * * * *

UNITED STATES PATENT AND TRADEMARK OFFICE
CERTIFICATE OF CORRECTION

PATENT NO. : 8,675,575 B2
APPLICATION NO. : 12/655158
DATED : March 18, 2014
INVENTOR(S) : Michelle X. Gong et al.

It is certified that error appears in the above-identified patent and that said Letters Patent is hereby corrected as shown below:

In the Claims

In column 8, line 66, in claim 1, delete "STA AID" and insert -- STA-AID --, therefor.

In column 9, line 40, in claim 9, after "and" delete "a".

In column 9, line 50, in claim 10, delete "Combination" and insert -- combination --, therefor.

In column 10, line 18, in claim 16, delete "an." and insert -- an omni-directional fashion. --, therefor.

Signed and Sealed this
Fifth Day of August, 2014

Michelle K. Lee
*Deputy Director of the United States Patent and Trademark Office*